United States Patent [19]

Springer et al.

[11] Patent Number: 5,047,515

[45] Date of Patent: Sep. 10, 1991

[54] WATER-SOLUBLE CONTAINING A FIBER-REACTIVE TRIAZINE RADICAL AND 6-CARBOXY-2-NAPHTHOL AS COUPLING COMPONENT, SUITABLE AS DYES

[75] Inventors: Hartmut Springer, Königstein/Taunus; Kurt Hussong, Kelkheim, both of Fed. Rep. of Germany

[73] Assignee: Hoechst Aktiengesellschaft, Frankfurt am Main, Fed. Rep. of Germany

[21] Appl. No.: 526,173

[22] Filed: May 21, 1990

Related U.S. Application Data

[63] Continuation of Ser. No. 461,700, Jan. 8, 1990, abandoned, which is a continuation of Ser. No. 295,892, Jan. 11, 1989, abandoned.

[30] Foreign Application Priority Data

Jan. 13, 1988 [DE] Fed. Rep. of Germany ....... 3800690

[51] Int. Cl.$^5$ .................. C09B 62/085; C09B 62/51; D06P 1/38
[52] U.S. Cl. .................................. 534/638; 534/582; 534/632
[58] Field of Search ........................ 534/632, 638, 642

[56] References Cited

U.S. PATENT DOCUMENTS

| | | | |
|---|---|---|---|
| 3,223,470 | 12/1965 | Boedeker et al. | 534/642 X |
| 4,626,589 | 12/1986 | Omura et al. | 534/642 X |
| 4,703,111 | 10/1987 | Segal et al. | 534/642 X |
| 4,873,320 | 10/1989 | Springer et al. | 534/642 X |

FOREIGN PATENT DOCUMENTS

| | | | |
|---|---|---|---|
| 63739 | 11/1982 | European Pat. Off. | 534/642 |
| 960534 | 7/1947 | Fed. Rep. of Germany | 534/642 |
| 965902 | 7/1949 | Fed. Rep. of Germany | 534/642 |
| 641816 | 10/1927 | France | 534/642 |
| 62-153351 | 7/1987 | Japan | 534/642 |

Primary Examiner—Mary C. Lee
Assistant Examiner—Fiona T. Powers

[57] ABSTRACT

Monoazo compounds which conform to the general formula (1) given below and are used as fiber-reactive dyes for dyeing carboxamido-containing and/or hydroxy-containing materials, for example wool, synthetic polyamide fibers and in particular cellulose fibers, in fast, predominantly yellowish red, red and orange shades.

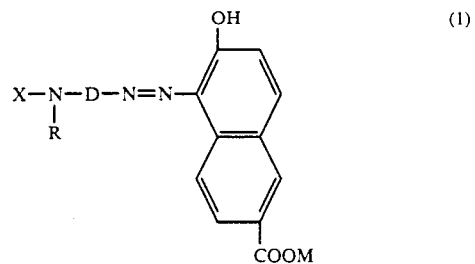

where
M is a hydrogen atom or an alkali meal or a divalent metal,
D is an unsubstituted or carboxy- and/or sulfosubstituted phenylene or naphthylene radical,
the group X-N(R)- is a fiber-reactive group in which R is hydrogen or substituted or unsubstituted alkyl and X denotes a group of the formula (2)

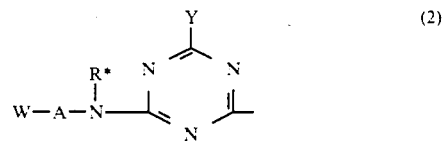

where Y is halogen, R* is hydrogen or substituted or unsubstituted alkyl, A is a direct bond or an ethyleneamino- or sulfo- or carboxy- substituted phenylamino or a lower alkylene group and W denotes a phenyl or naphthyl radical which in either case is substitutred by a fiber-reactive group of the vinyl sulfone series and which in the case of naphthyl can be substituted by 1 or 2 sulfo groups and in the case of phenyl in addition by substituents selected inter alia from the group consisting of alkyl, alkoxy, chlorine, sulfo, carboxy, nitro and alkylamino.

7 Claims, No Drawings

WATER-SOLUBLE CONTAINING A FIBER-REACTIVE TRIAZINE RADICAL AND 6-CARBOXY-2-NAPHTHOL AS COUPLING COMPONENT, SUITABLE AS DYES

This application is a continuation of copending U.S. patent application Ser. No. 07/461,700, filed on Jan. 8, 1990, now abandoned, which is a continuation of application Ser. No. 07/295,892, filed on Jan. 11, 1989, now abandoned.

The present invention relates to fiber reactive dyes.

The present invention provides novel, useful fiber-reactive monoazo compounds which possess fiber-reactive dye properties and conform to the general formula (1)

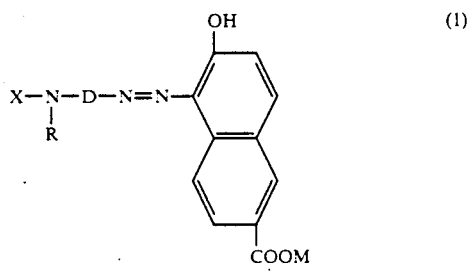

where the variables have the following meanings:

D is a para- or meta-phenylene group which can be substituted by 1 carboxy group or 1 or 2 sulfo groups, or is a naphthylene group which contains the azo group bonded in the 1- or 2-position and to which the grouping X-N(R)- is bonded in the 5- or 6-position and which can be substituted by one carboxy group or 1 or 2 sulfo groups, R is a hydrogen atom or an alkyl group of 1 to 4 carbon atoms, such as methyl or ethyl, or is a hydroxy-, cyano-, carboxy-, sulfo-, sulfato- or phosphato- or phenyl- or sulfophenyl-substituted alkyl group of 1 to 4 carbon atoms, such as, for example, a benzyl, phenethyl β-cyanoethyl, β-carboxyethyl, β-sulfoethyl, β-sulfatoethyl, β-phosphatoethyl or sulfomethyl group, of which preferably hydrogen or methyl, M is a hydrogen atom or an alkali metal or one equivalent of a divalent metal, as of an alkaline earth metal, as for example of calcium, but preferably hydrogen or an alkali metal, such as sodium or potassium or lithium, X is a group of the general formula (2)

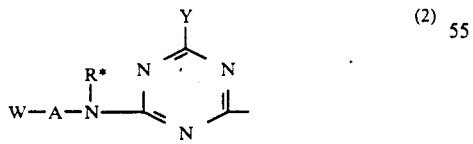

where

Y is halogen, such as fluorine and in particular chlorine,

R* is a hydrogen atom or an alkyl group of 1 to 4 carbon atoms, such as ethyl or methyl, or is an alkyl group of 1 to 4 carbon atoms which is substituted by a sulfo, carboxy, phosphato, sulfato, hydroxy or cyano group, A is a direct bond or a group of the formula (3a), (3b) or (3c)

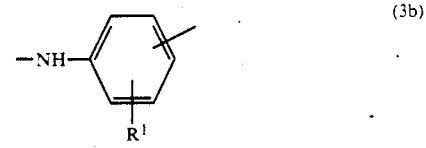

where

R$^1$ is a hydrogen atom or a sulfo or carboxy group, the free bond in the benzene nucleus of the formula (3b) is bonded in the meta-position or preferably in the para-position relative to the group -NH-and p denotes the number 1, 2 or 3, and W is a group of the general formula (4a) or (4b)

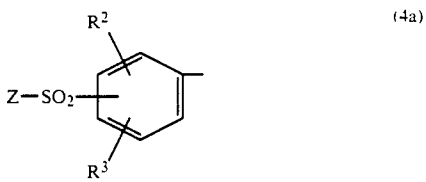

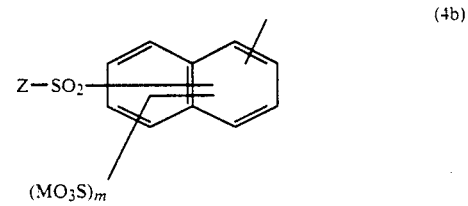

where

R$^2$ is a hydrogen atom or an alkyl group of 1 to 4 carbon atoms, such as ethyl and in particular methyl, an alkoxy group of 1 to 4 carbon atoms, such as ethoxy and in particular methoxy, a chlorine or bromine atom, a hydroxy, sulfo, carboxy or nitro group or an alkylamino group of 1 to 4 carbon atoms or an alkylamino group of 1 to 4 carbon atoms which is substituted in the alkyl radical by hydroxy, sulfato, sulfo, phosphato, alkanoyloxy of 2 to 5 carbon atoms or by carboxy-substituted alkanoyl-amido of 1 to 4 carbon atoms in the alkylene radical, such as succinamido of the formula MOOC-CH$_2$-CH$_2$-CO-NH-with M of the above meaning, R$^3$ is a hydrogen atom or an alkyl group of 1 to 4 carbon atoms, such as ethyl and in particular methyl, or an alkoxy group of 1 to 4 carbon atoms, such as ethoxy and in particular methoxy, Z is a vinyl group or an ethyl group which is substituted in the β-position by a substituent which can be eliminated by alkali to form a vinyl group.

m stands for the number zero, 1 or 2 (in the case of m being zero, this group denoting a hydrogen atom) and M has the abovementioned meaning.

Substituted alkylamino groups R$^2$ are for example β-sulfatoethylamino and β-succinamidoethylamino.

Alkali-eliminable substituents in the β-position in the ethyl group are for example a halogen atom, such as chlorine or bromine, ester groups or organic carboxylic and sulfonic acids, such as alkanoyloxy of 2 to 5 carbon atoms, for example acetyloxy, or a sulfobenzoyloxy, benzoyloxy, phenylsulfonyloxy or (methylphenyl)sulfonyloxy group, further a phosphato, sulfato or thiosulfato group or a dialkylamino group having alkyl groups of 1 to 4 carbon atoms each, such as dimethylamino and diethylamino. Of these, sulfato is preferred.

Of the azo compounds of the general formula (1) according to the invention, especially preferred ones are those where R stands for hydrogen, those where D is a meta- or para-phynylene group which is substituted by 1 or 2 sulfo groups, those where A is a direct bond, and those where W stands for a group of the general formula (4a).

Preferably, $R^2$ is a hydrogen atom or a methyl, methoxy or ethoxy group or a chlorine atom and $R^3$ denotes a hydrogen atom or a methoxy or ethoxy group.

Of the azo compounds according to the invention, especially preferred ones are those of the general formula (1a)

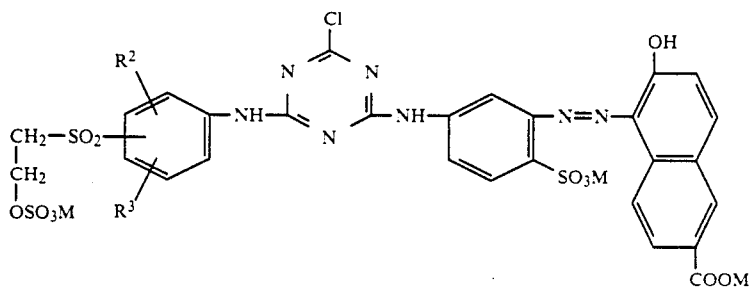

(1a)

where M, $R^2$ and $R^3$ have the abovementioned, in particular the preferred, meanings and the β-sulfatoethylsulfonyl group is bonded to the benzene nucleus in the meta- or para-position relative to the amino group.

A sulfo-substituted phenylene group D is preferably a radical of the general formula (3d)

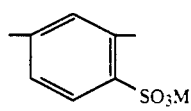

(3d)

with M of the abovementioned meaning.

Hereinbefore and hereinafter, a sulfo group is a group conforming to the general formula -SO$_3$M, a carboxy group is a group conforming to the general formula -COOM, a thiosulfato group is a group conforming to the general formula -S-SO$_3$M, a sulfato group is a group conforming to the general formula -OSO$_3$M and a phosphato group is a group conforming to the general formula —OSO$_3$M$_2$, in each of which M has the abovementioned meaning.

The novel azo compounds can be present in acid form and in the form of their salts. Preferably, they are in the form of their salts, in particular alkali and alkaline earth metal salts, and are preferably also used in the form of these salts for dyeing (to be understood here and hereinafter in the general sense and as including printing) hydroxy- and/or carboxamido-containing materials, in particular fiber materials.

The present invention further relates to processes for preparing the compounds of the general formula (1), which comprise (a) reacting a compound of the general formula (5)

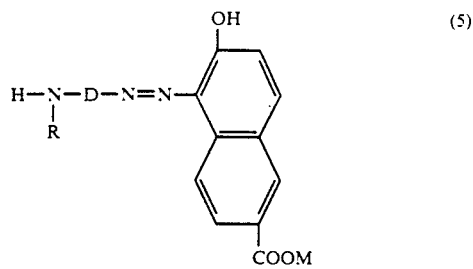

where R, D and M have the abovementioned meanings, in a conventional manner with a compound of the general formula (6)

(6)

where X and Y have the abovementioned meanings, the variable Z in X here denoting a radical Z'

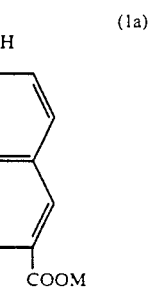

which represents a β-hydroxyethyl group or has the meaning of Z, or (b) dizotizing an aromatic amino compound of the general formula (7)

(7)

where X, R and D have the abovementioned meanings, the variable Z in X here representing a radical Z' of the abovementioned meaning, and coupling the diazonium salt with 2-naphthol-6-carboxylic acid or a salt of this carboxylic acid, or (c) reacting a compound of the general formula (8)

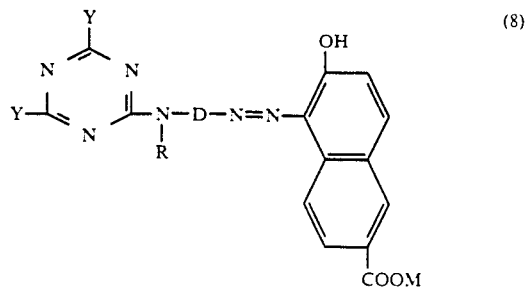

(8)

where the two Ys and also R, D and M have the abovementioned meanings, with an amino compound of the general formula (9)

with W, A and R* of the above meaning, the variable Z in W here representing a Z' of the abovementioned meaning, and if starting compounds where Z' is β-hydroxyethyl are used, converting this β-hydroxyethyl group in the resulting compound conforming to the formula (1) with Z here a β-hydroxyethyl group as a matter of necessity analogously to known procedures by means of an esterifying or acylating agent, for example a phosphating or sulfating agent or an organic acid halide or anhydride, into an esterethyl or acyloxyethyl, for example β-phosphatoethyl or β-acetyloxyethyl or preferably β-sulfatoethyl, group.

Procedure (b) is carried out analogously to known procedures for diazotization and coupling. The diazotization of the amino compound of the general formula (7) is in general carried out in an aqueous mineral acid medium by means of sodium nitrite, i.e. by the action of nitrous acid, at a pH of 2 or less than 2 and at a temperature between $-10°$ C. and $+15°$ C., preferably between $-5°$ C. and $+10°$ C. The coupling of the diazonium salt of amine (7) with 2-naphthol-6-carboxylic acid or a salt thereof is likewise in general carried out in an aqueous medium at a temperature between 0° and 30° C., preferably between 5° and 20° C., and at a pH between 3.5 and 7.5, preferably between 4 and 7, in particular between 4 and 6.

The reaction conditions of procedures (a) and (c) are analogous to known procedures for reacting amino compounds with dihalotriazinylamino compounds, for instance in an aqueous or aqueous organic medium (where the organic solvent component is a preferably water-soluble solvent which is inert under the reaction conditions, for example acetone, dimethylformamide or dimethyl sulfoxide) at a pH between 1 and 7, in particular between 2 and 6, and at a temperature between $-10°$ C. and $+80°$ C., in particular $-10°$ C. and $+50°$ C.

The starting compounds of the general formula (5) are easily preparable analogously to known processes by coupling the diazotized amine H(R)N-D-NH$_2$ with D and R of the abovementioned meaning with 2-hydroxynaphthalene-6-carboxylic acid or a salt of this carboxylic acid in accordance with the above reaction conditions for diazotization and coupling. Not only these diamino compounds but also -b 2-naphthol-6-carboxylic acid are generally known and described in the literature.

Similarly, the starting amino compounds conforming to the general formula (7) containing the fiber-reactive radical X are generally known; they can be prepared by reacting the corresponding diamino compound of the general formula H(R)N-D-NH$_2$ with D and R of the abovementioned meaning with an aminohalotrizine compound conforming to the general formula (6). Similarly, the starting compounds of the general formula (8) are preparable analogously to other azo compounds which contain such a dihalotrizinylamino radical in bonded form by reacting an aminoazo compound conforming to the general formula (5) with cyanuric chloride or cyanuric fluoride. Process conditions for such reactions are generally known and essentially conform to the process conditions specified hereinafter for the reactions between starting compounds (5) and (6) or (8) and (9).

To neutralize the hydrogen halide freed in the course of condensation reactions, use is generally made of alkali and alkaline earth metal carbonates, alkali and alkaline earth metal hydrogencarbonates or alkali or alkaline earth metal hydroxides or else alkali metal acetates, the alkali and alkaline earth metals preferably being sodium, potassium and calcium; acid-binding agents are also tertiary amines, for example pyridine or triethylamine or quinoline.

The reaction according to the invention between aminoazo compounds of the general formula (5) and an aminodihalotriazine compound of the general formula (6) generally takes place, if Y is chlorine, at a pH between 4 and 7, preferably between 5 and 6, and at a temperature between 0° and 50° C., preferably between 10° and 40° C., particularly preferably between 10° and 30° C., and if Y is fluorine, at a pH between 4 and 7, preferably between 5 and 6, and at a temperature between $-10°$ C. and $+40°$ C., preferably between $-10°$ and $+30°$ C., particularly preferably between 0° C. and $+10°$ C.

The reaction according to the invention between dihalotriazinylaminoazo compounds conforming to the general formula (8) and an amino compound of the general formula (9) generally takes place, if Y is chlorine, at a pH between 4 and 7, preferably between 5 and 6, and at a temperature between 0° and 50° C., preferably between 10 and 40° C., particularly preferably between 10° and 30° C., and if Y is fluorine, at a pH between 4 and 7, preferably between 5 and 6, and at a temperature between $-10°$ C. and $+40°$ C., preferably between $-10°$ C. and $+30°$ C., particularly preferably between 0° C. and $+10°$ C.

Amino starting compounds conforming to the general formula (9) are for example 3-(β-sulfatoethylsulfonyl)-aniline, 2-methoxy-5-(β-sulfatoethylsulfonyl)-aniline, 2-methoxy-4-(β-sulfatoethylsulfonyl)-aniline, 2-methyl-5-(β-sulfatoethylsulfonyl)-aniline, 2-methyl-5-(β-sulfatoethylsulfonyl)-aniline, 2methyl-4-(β-sulfatoethylsulfonyl)-aniline, 4-methoxy-5-(β-sulfatoethylsulfonyl)-aniline, 4-methyl-5-(β-sulfatoethylsulfonyl)-aniline, 2-methoxy-5-methyl-4-(β-sulfatoethylsulfonyl)-aniline, 2,5-dimethoxy-4-(β-sulfatoethylsulfonyl)-aniline, 2,4-dimethoxy-4-(β-sulfatoethylsulfonyl)-aniline, 2-methyl-5-methoxy-4-(β-sulfatoethylsulfonyl)-aniline, 2-chloro-5-(β-sulfatoethylsulfonyl)-aniline, 4-chloro-2-methyl-3-(β-sulfatoethylsulfonyl)-aniline, 5-chloro-2-methoxy-4-(β-sulfatoethylsulfonyl)-aniline, 4-(β-sulfatoethylsulfonyl)-aniline, 6-(β-sulfatoethylsulfonyl)-2-aminonaphthalene, 6-(β-sulfatoethylsulfonyl)-8-sulfo-2-aminonaphthalene, 8-(β-sulfatoethylsulfonyl)-1-sulfo-2-aminonaphthalene, 8-(β-sulfatoethylsulfonyl)-6-sulfo-2-aminonaphthalene, 8-(β-sulfatoethylsulfonyl)-2-naphthalene, β-[4-(β'-sulfatoethylsulfonyl)-phenyl]-ethylamine, 4-(β-sulfatoethylsulfonyl)-benzylamine, β-]N-(2-nitro-4-β'-sulfatoethylsulfonyl)-phenyl]-aminoethylamine, 4-[N-(2'-nitro-4'-β-sulfatoethylsulfonyl)-phenyl]-aminoaniline, 4-sulfo-3-[N-(2'-nitro-4'-β-sulfatoethylsulfonyl)-phenyl]-aminoaniline and 3-sulfo-4-[N-(2'-nitro-4'-β-sulfatoethylsulfonyl)-phenyl]-aminoaniline and derivatives thereof in which the β-sulfatoethylsulfonyl group has been replaced by a β-hyroxyethylsulfonyl group or by an ethylsulfonyl group which has an alkali-eliminable substituent in the β-position, in particular a β-thiosulfatoethylsulfonyl or β-phosphatoethylsulfonyl group.

Diamino starting compounds conforming to the general formula H(R)N-D-NH$_2$ are for example 4,6-disulfo-1,3-diaminobenzene, 2,5-disulfo-1,4-diaminobenzene, 4-sulfo-1,3-diaminobenzene, 2-sulfo-1,4-diaminobenzene, 4-carboxy-1,3-diaminobenzene, 2-carboxy-1,4-diaminobenzene, 2-sulfo-4-(methylamino)-aniline, 4-sulfo-3-(methylamino)-aniline, 2-sulfo-4-(ethylamino)-aniline, 4-sulfo-3-(ethylamino)-aniline, 4-N-(β-sulfoethyl)-aminoaniline and 4,8-disulfo-1,6-diaminonaphthalene.

The azo compounds of the general formula (1) prepared according to the invention can be precipitated and isolated from the synthesis solutions by generally known methods, for example either by precipitating them from the reaction medium by means of electrolytes, for example sodium chloride or potassium chloride, or by evaporating the reaction solution, for example by spray drying, in which case a buffer substance can be added to the reaction solution.

The azo compounds of the general formula (1) according to the invention—hereinafter referred to as compounds (1)—have fiber-reactive dye properties, as already mentioned. They can therefore be used for dyeing (including printing) hydroxy-containing and/or carboxamido-containing materials, in particular fiber materials. It is also possible to use the solutions obtained in the synthesis of compounds (1), with or without addition of a buffer substance and with or without concentrating, directly in dyeing as liquid formulations.

The present invention therefore also provides the use of compounds (1) for dyeing (including printing) hydroxy- and or carboxamido-containing materials, or rather processes for their application to these substrates. Preferably, the materials are employed for application in the form of fiber materials, in particular in the form of textile fibers, such as yarns, wound packages and fabrics. This application can be carried out analogously to known processes.

Hydroxy-containing materials are those of natural or synthetic origin, for example cellulose fiber materials or regenerated products thereof, and polyvinyl alcohols. Cellulose fiber materials are preferably cotton but other vegetable fibers as well, such as linen, hemp, jute and ramie fibers; regenerated cellulose fibers are for example staple and filament viscose.

Carboxamido-containing materials are for example synthetic and natural polyamides and polyurethanes, in particular in the form of fibers, for example wool and other animal hair, silk, leather, nylon-6,6, nylon-6, nylon-11 and nylon-4.

The compounds can be applied to and fixed on the substrates mentioned in accordance with the use according to the invention, in particular the fiber materials mentioned, by the application techniques known for water-soluble dyes, in particular fiber-reactive dyes, for example by applying a compound (1) in dissolved form to the substrate or incorporating it therein and fixing it thereon or therein with or without heating and/or with or without the action of an alkaline agent. Such dyeing and fixing methods are numerously described in the trade and patent literature, for example in European Patent Application Publication No. 0,181,585A.

Using compounds (1) it is possible not only on carboxamido-containing materials, in particular on wool, but also on hydroxyl-containing material, in particular cellulose fiber material, to produce yellowish to bluish red dyeings and prints of high color yield and good color buildup, in which the brilliant hue is retained even in deep shades. The dyeings and prints have good fastness properties, such as good light and wet fastness properties and good pleating fastness, hot press fastness and crock fastness.

Of the dyeings and prints on carboxamido-containing material, in particular on wool, the light, wash and wet light fastness properties can be singled out, even if an otherwise customary ammoniacal after treatment of the dyed material is dispensed with. They are highly compatible with other fiber-reactive wool dyes, which permits level dyeing of the fiber. Similarly, it is possible to obtain level dyeings on material made of wool fibers of different proveniences with compounds (1), in which case a customary leveling assistant, for example N-methyltaurine, may be added to improve the leveling properties.

Preferably, compounds (1) are used for dyeing cellulose fiber materials. Of the good fastness properties obtainable thereon, in particular the good wash fastness properties at 60° to 95° C., even in the presence of perborates, the acid fulling, cross-dyeing and perspiration fastness properties, the high steam resistance and good acid, water and seawater fastness properties should be mentioned.

The Examples below serve to illustrate the invention. Parts and percentages are by weight, unless otherwise stated. Parts by weight bear the same relation to parts by volume as the kilogram to the liter.

The compounds described below in the Examples in terms of formulae are shown in the form of the free acids; in general, they are prepared and isolated in the form of their sodium or potassium salts and are used for dyeing in the form of their salts. It is similarly possible to use in the synthesis the starting compounds and components mentioned in the form of the free acid in the Examples below, in particular the table Examples, as such or in the form of their salts, preferably alkali metal salts, such as sodium or potassium salts.

The absorption maxima (λ$_{max}$ values) given for the visible region were determined at 20° C. on the alkali metal salts thereof in aqueous solution.

EXAMPLE 1

(a) A solution at pH 6 of 148 parts of 4-(β-sulfatoethylsulfonyl)-aniline in 500 parts of water is stirred into a suspension of 100 parts of cyanuric chloride and 3 parts of a commercially available wetting agent in 800 parts of ice and water. Stirring is continued for some time at a temperature between 0° and 5° C. while the pH is maintained between 3.5 and 4.5 by means of sodium bicarbonate. The conversion of the acylation reaction is 99% or higher.

(b) The reaction batch prepared under (a) is stirred into a solution of 134 parts of 1,3-diaminobenzene-4,6-disulfonic acid in about 600 parts of water at a pH between 6 and 7, the reaction mixture is heated to 40° C., and stirring is continued at a temperature between 40° and 45° C. while the pH is maintained between 5 and 6 by means of sodium bicarbonate, until the diamino compound is virtually no longer detectable.

(c) The batch obtained from the second acylation reaction under (b) is admixed with 1000 parts of ice and 150 parts by volume of aqueous 31% strength hydrochloric acid and diazotized with an aqueous solution of 35 parts of sodium nitrite. The diazotization mixture obtained is added with stirring to a solution of 94 parts of 2-naphthol-6-carboxylic acid in about 1100 parts of water at a pH between 6 and 6.5, the pH being maintained at between 5 and 6 by means of sodium bicarbonate throughout the entire coupling reaction. Stirring is continued for some time until the coupling has ended.

The novel monoazo compound thus prepared is isolated in a conventional manner, for example by evaporating or spray-drying the neutral synthesis solution or by salting out with sodium chloride or potassium chloride. An electrolyte-containing yellow powder is obtained of the alkali metal salt of the compound of the formula Thereafter the reaction mixture is raised to a temperature of 40° to 50° C. in the course of 2 hours and stirred at 40° to 50° C. for about a further 12 hours while a pH between 4.5 and 6.5 is maintained until the acylation reaction has ended.

The novel azo compound prepared, which is identical to that of Example 1, is isolated in the manner described in Example 1. It has the same properties as the novel monoazo compound prepared as described in Example 1.

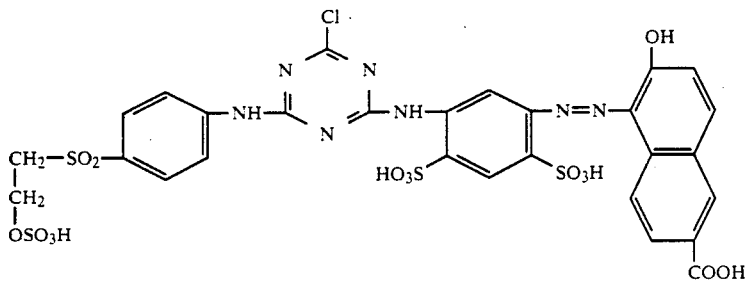

($\lambda_{max}$ = 479 nm)

which shows very good fiber-reactive dye properties and, applied to the materials mentioned in the description, in particular cellulose-fiber materials, for example cotton, by the application and fixing methods customary in the art, in particular by the application conditions described and employed for fiber-reactive dyes, produces strong bright orange-colored dyeings and prints

EXAMPLE 3

To prepare a monoazo compound according to the invention, the procedure described in Example 1 is followed, except that the 4-(β-thiosulfatoethylsulfonyl)-aniline.

The novel azo compound of the formula

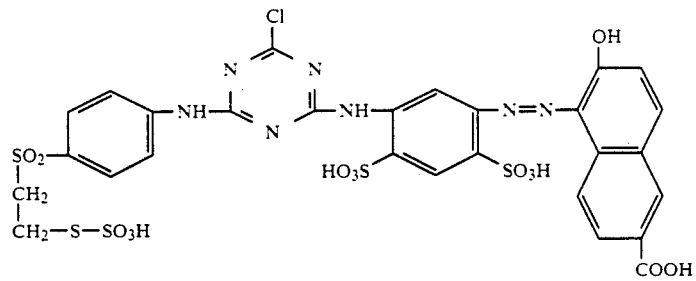

($\lambda_{max}$ = 477 nm)

having good light fastness properties and good wet fastness properties, in particular good wash, fulling and perspiration fastness properties.

EXAMPLE 2

(a) A solution of 39 parts of cyanuric chloride in 150 parts by volume of acetone is added with stirring to 300 parts of ice; about 1000 parts by volume of an aqueous cold, less than 10° C., neutral solution of 108 parts of an aminoazo compound synthesized from 4,6-disulfo-1,3-diaminobenzene as diazo component and 2-naphthol-6-carboxylic acid as coupling component are added with stirring to the suspension. The batch is subsequently stirred at 0° to 10° C. for about 4 more hours at a pH maintained between 4 and 5 until amine is virtually no longer detectable.

(b) 400 parts by volume of an aqueous neutral solution of 59 parts of 4-(β-sulfatoethylsulfonyl)-aniline are stirred into the reaction batch prepared under (a).

is obtained in the form of an alkali metal salt as an electrolyte-containing yellow powder. It has very good fiber-reactive dye properties and, applied to the materials mentioned in the description, for example cotton, by the application and fixing methods customary in the art, in particular the application conditions described and employed for fiber-reactive dyes, produces strong bright orange-colored dyeings and prints having good light fastness properties and good wet fastness properties, in particular good wash fastness properties.

EXAMPLE 4

To prepare a monoazo compound according to the invention, the procedure of Example 2 is followed, except that the aqueous solution of 4-(β-sulfatoethylsulfonyl)-aniline used there in Example 2b) is replaced by an aqueous solution of 39 parts of 4-vinylsulfonylaniline in 200 parts by volume of acetone.

The novel azo compound of the formula

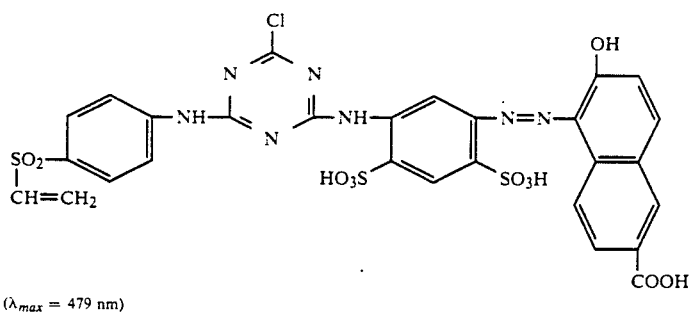

($\lambda_{max}$ = 479 nm)

is obtained in the form of an alkali metal salt as an electrolyte-containing yellow powder. It likewise has very good fiber-reactive dye properties and, applied to the materials mentioned in the description, for example cotton, by the application and fixing methods customary in the art, in particular the application conditions described and employed for fiber-reactive dyes, produces strong bright orange-colored dyeings and prints having good light fastness properties and good wet fastness properties, in particular good wash, fulling, perspiration and cross-dyeing fastness properties.

EXAMPLE 5

To prepare a monoazo compound according to the invention, the procedure of Example 1 is followed, except that 1,3-diaminobenzene-4,6-disulfonic acid is replaced by the same amount of 1,4-diamino-2,5-disulfonic acid, affording the novel azo compound of the formula aqueous solution of the sodium salt of 28.1 parts of 4-($\beta$-sulfatoethylsulfonyl)-aniline in 150 parts of water while the pH is maintained between 5 and 5.5. Stirring is continued at 0° C. for a further 5 to 10 minutes within the stated pH range until a sample shows the absence of diazotizables.

(b) The solution of the monocondensation produce prepared under (a) is stirred at a temperature between 10° and 15° C. and at a pH between 5 and 5.5 into a solution of the sodium salt of 19 parts of 1,3-diaminobenzene-4-sulfonic acid in 200 parts of water in the course of 15 to 20 minutes. The reaction batch is subsequently stirred for about a further hour within that temperature and pH range.

(c) The dicondensation product prepared as described in section (b) is not isolated from the synthesis solution obtained but diazotized directly, for example by addition of 6.9 parts of sodium nitrite and subsequently by addition of an aqueous concentrated hy-

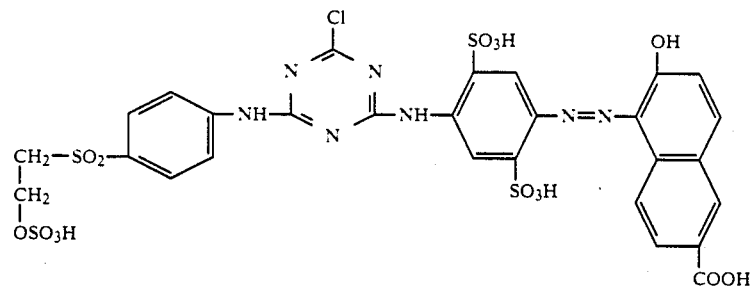

($\lambda_{max}$ = 495 nm)

in the form of an alkali metal salt as an electrolyte-containing reddish orange powder. It has very good fiber-reactive dye properties and, applied to the material mentioned in the description, in particular cellulose fiber materials, for example cotton, produces strong bright dyeings and prints of scarlet shade having good light and wet fastness properties, of which the good wash, fulling and perspiration fastness properties are noteworthy.

EXAMPLE 6

(a) 13.6 parts of cyanuric fluoride are added at 0° C. in the course of 5 to 10 minutes at a uniform rate to an drochloric acid solution at a temperature between 0° and 10° C. The diazonium salt solution or suspension is then stirred into a solution of 94 parts of 2-naphthol-6-carboxylic acid in about 1100 parts of water at a pH of about 6 and subsequently stirred for about an hour at a pH maintained between 5 and 6 until the coupling reaction has ended.

The monoazo compound according to the invention is isolated from the synthesis solution, for example by evaporating or spray drying or by salting out with sodium chloride or potassium chloride, affording an alkali metal salt of a compound of the formula

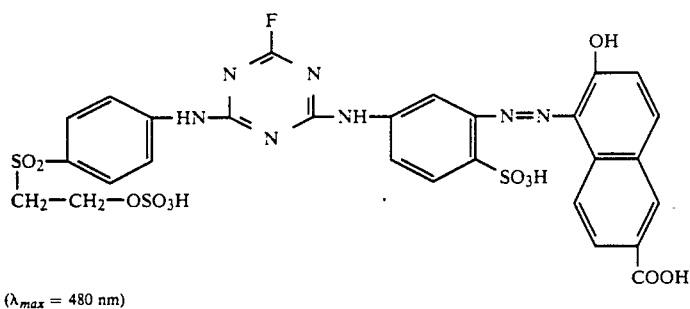

($\lambda_{max}$ = 480 nm)

which has very good fiber-reactive dye properties and, applied to the materials mentioned in the description, in particular wool, including wool with a low-felting finish, by the application methods customary in the art, produces strong brilliant orange dyeings and prints with good color buildup and good fastness properties, of which in particular the good wash, fulling, perspiration and cross-dyeing fastness properties can be singled out.

EXAMPLE 7

To prepare a monoazo compound according to the invention, the procedure of Example 2 is followed, except that in place of the aminoazo starting compound used therein the same amount of the isomeric starting compound from 2,5-disulfo-1,4-diaminobenzene as diazo component and 2-naphthol-6-carboxylic acid as coupling component is used. The novel monoazo compound described in Example 5 is obtained with the good dye properties described there.

EXAMPLES 8 to 292

The Table Examples below describe further novel monoazo compounds conforming to the general formula (A)

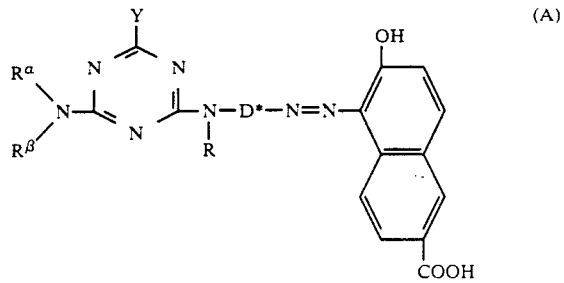

in terms of their components. They can be prepared in a manner according to the invention, for example by one of the procedures described in Examples 1 to 7, from the corresponding starting compounds (2-naphthol-6-carboxylic acid as coupling component, the di-amino compound of the general formula H(R)N-D-NH$_2$, cyanuric chloride or cyanuric fluoride and an amino compound conforming to the formula R$^\alpha$R$^\beta$NH). They have very good dye properties and produce on the materials mentioned in the description, in particular cellulose fiber materials, for example cotton, and likewise on wool, strong dyeings and prints having good fastness properties in the hue indicated in the particular Table Example for a dyeing on cotton (the values given in parentheses are $\lambda_{max}$ values in nm).

| Ex. | Radical R$^a$— | Radical R$^8$— | Radical Y | Radical —D*— | Radical R— | Hue |
|---|---|---|---|---|---|---|
| 8 | 3-(β-Sulfatoethylsulfonyl)-phenyl | H | Chloro | 4,6-Disulfo-1,3-phenylene | H | Orange (481) |
| 9 | 2-Methoxy-5-(β-sulfatoethylsulfonyl)-phenyl | H | Chloro | " | H | Orange (483) |
| 10 | 2-Methoxy-4-(β-sulfatoethylsulfonyl)-phenyl | H | Chloro | " | H | Orange |
| 11 | 2-Methyl-5-(β-sulfatoethylsulfonyl)-phenyl | H | Chloro | " | H | Orange |
| 12 | 2-Methyl-4-(β-sulfatoethylsulfonyl)-phenyl | H | Chloro | " | H | Orange |
| 13 | 4-Methoxy-5-(β-sulfatoethylsulfonyl)-phenyl | H | Chloro | " | H | Orange |
| 14 | 4-Methyl-5-(β-sulfatoethylsulfonyl)-phenyl | H | Chloro | " | H | Orange |
| 15 | 2-Methoxy-5-methyl-4-(β-sulfatoethylsulfonyl)-phenyl | H | Chloro | " | H | Orange |
| 16 | 2,5-Dimethoxy-4-(β-sulfatoethylsulfonyl)-phenyl | H | Chloro | " | H | Orange |
| 17 | 2,4-Dimethoxy-5-(β-sulfatoethylsulfonyl)-phenyl | H | Chloro | " | H | Orange |
| 18 | 2-Methyl-5-methoxy-4-(β-sulfatoethylsulfonyl)-phenyl | H | Chloro | " | H | Orange |
| 19 | 2-Chloro-5-(β-sulfatoethylsulfonyl)-phenyl | H | Chloro | " | H | Orange |
| 20 | 4-Chloro-2-methyl-5-(β-sulfatoethylsulfonyl)-phenyl | H | Chloro | " | H | Orange |
| 21 | 5-Chloro-2-methoxy-4-(β-sulfatoethylsulfonyl)phenyl | H | Chloro | " | H | Orange |
| 22 | 3-(β-Phosphatoethylsulfonyl)-phenyl | H | Chloro | " | H | Orange |
| 23 | 3-(β-Thiosulfatoethylsulfonyl)-phenyl | H | Chloro | " | H | Orange |
| 24 | 4-(β-Phosphatoethylsulfonyl)-phenyl | H | Chloro | " | H | Orange |
| 25 | 4-(β-Thiosulfatoethylsulfonyl)-phenyl | H | Chloro | " | H | Orange |
| 26 | 6-(β-Sulfatoethylsulfonyl)-naphth-2-yl | H | Chloro | " | H | Orange |
| 27 | 6-(β-Sulfatoethylsulfonyl)-8-sulfonaphth-2-yl | H | Chloro | " | H | Orange (483) |
| 28 | 8-(β-Sulfatoethylsulfonyl)-naphth-2-yl | H | Chloro | " | H | Orange |
| 29 | 8-(β-Sulfatoethylsulfonyl)-1-sulfonaphth-2-yl | H | Chloro | " | H | Orange |
| 30 | 8-(β-Sulfatoethylsulfonyl)-6-sulfonaphth-2-yl | H | Chloro | " | H | Red (501) |
| 31 | 4-(β-Sulfatoethylsulfonyl)-phenethyl | H | Chloro | " | H | Orange |
| 32 | 4-(β-Sulfatoethylsulfonyl)-benzyl | H | Chloro | " | H | Orange |
| 33 | β-[2-Nitro-4-(β-sulfatoethylsulfonyl)-phenyl]-aminoethyl | H | Chloro | " | H | Orange |
| 34 | 4-[N-[2'-Nitro-4'-(β-sulfatoethylsulfonyl)-phenyl]-amino]-phenyl | H | Chloro | " | H | Orange |
| 35 | 2-Sulfo-5-[[2'-nitro-4'-(β-sulfatoethyl-sulfonyl)-phenyl]-amino]-phenyl | H | Chloro | " | H | Orange |
| 36 | 3-(β-Sulfatoethylsulfonyl)-phenyl | H | Chloro | 2,5-Disulfo-1,4-phenylene | H | Yellowish red (494) |
| 37 | 2-Methoxy-5-(β-sulfatoethylsulfonyl)-phenyl | H | Chloro | " | H | Reddish orange |
| 38 | 2-Methoxy-4-(β-sulfatoethylsulfonyl)-phenyl | H | Chloro | " | H | Reddish orange |
| 39 | 2-Methyl-5-(β-sulfatoethylsulfonyl)-phenyl | H | Chloro | " | H | Reddish orange |
| 40 | 2-Methyl-4-(β-sulfatoethylsulfonyl)-phenyl | H | Chloro | " | H | Reddish orange |
| 41 | 4-Methoxy-5-(β-sulfatoethylsulfonyl)-phenyl | H | Chloro | " | H | Reddish orange |
| 42 | 4-Methyl-5-(β-sulfatoethylsulfonyl)-phenyl | H | Chloro | " | H | Reddish orange |
| 43 | 2-Methoxy-5-methyl-4-(β-sulfatoethylsulfonyl)-phenyl | H | Chloro | " | H | Reddish orange |
| 44 | 2,5-Dimethoxy-4-(β-sulfatoethylsulfonyl)-phenyl | H | Chloro | " | H | Reddish orange |
| 45 | 2,4-Dimethoxy-5-(β-sulfatoethylsulfonyl)-phenyl | H | Chloro | " | H | Reddish orange |
| 46 | 2-Methyl-5-methoxy-4-(β-sulfatoethylsulfonyl)-phenyl | H | Chloro | " | H | Reddish orange |
| 47 | 2-Chloro-5-(β-sulfatoethylsulfonyl)-phenyl | H | Chloro | " | H | Reddish orange |
| 48 | 4-Chloro-2-methyl-3-(β-sulfatoethylsulfonyl)-phenyl | H | Chloro | " | H | Reddish orange |
| 49 | 5-Chloro-2-methoxy-4-(β-sulfatoethylsulfonyl)-phenyl | H | Chloro | " | H | Reddish orange |
| 50 | 6-(β-Sulfatoethylsulfonyl)-naphth-2-yl | H | Chloro | " | H | Reddish orange |
| 51 | 6-(β-Sulfatoethylsulfonyl)-8-sulfonaphth-2-yl | H | Chloro | " | H | Reddish orange |
| 52 | 8-(β-Sulfatoethylsulfonyl)-naphth-2-yl | H | Chloro | " | H | Reddish orange |
| 53 | 8-(β-Sulfatoethylsulfonyl)-1-sulfonaphth-2-yl | H | Chloro | " | H | Reddish orange |
| 54 | 8-(β-Sulfatoethylsulfonyl)-6-sulfonaphth-2-yl | H | Chloro | " | H | Reddish orange |

-continued

| | Monoazo compound of the formula (A) | | | | | |
|---|---|---|---|---|---|---|
| Ex. | Radical $R^a$— | Radical $R^8$— | Radical Y | Radical —D*— | Radical R— | Hue |
| 55 | 3-(β-Sulfatoethylsulfonyl)-phenyl | H | Chloro | 2-SO₃H-phenyl (para-methyl) | H | Orange (485) |
| 56 | 2-Methoxy-5-(β-sulfatoethylsulfonyl)-phenyl | H | Chloro | " | H | Orange (486) |
| 57 | 2-Methoxy-4-(β-sulfatoethylsulfonyl)-phenyl | H | Chloro | " | H | Orange |
| 58 | 2-Methyl-5-(β-sulfatoethylsulfonyl)-phenyl | H | Chloro | " | H | Orange |
| 59 | 2-Methyl-4-(β-sulfatoethylsulfonyl)-phenyl | H | Chloro | " | H | Orange |
| 60 | 4-Methoxy-5-(β-sulfatoethylsulfonyl)-phenyl | H | Chloro | " | H | Orange |
| 61 | 4-Methyl-5-(β-sulfatoethylsulfonyl)-phenyl | H | Chloro | " | H | Orange |
| 62 | 2-Methoxy-5-methyl-4-(β-sulfatoethylsulfonyl)-phenyl | H | Chloro | " | H | Orange |
| 63 | 2,5-Dimethoxy-4-(β-sulfatoethylsulfonyl)-phenyl | H | Chloro | " | H | Orange |
| 64 | 2,4-Dimethoxy-5-(β-sulfatoethylsulfonyl)-phenyl | H | Chloro | " | H | Orange |
| 65 | 2-Methyl-5-methoxy-4-(β-sulfatoethylsulfonyl)-phenyl | H | Chloro | " | H | Orange |
| 66 | 2-Chloro-5-(β-sulfatoethylsulfonyl)-phenyl | H | Chloro | " | H | Orange |
| 67 | 4-Chloro-2-methyl-4-(β-sulfatoethylsulfonyl)-phenyl | H | Chloro | " | H | Orange |
| 68 | 5-Chloro-2-methoxy-4-(β-sulfatoethylsulfonyl)-phenyl | H | Chloro | " | H | Orange |
| 69 | 4-(β-Sulfatoethylsulfonyl)-phenyl | H | Chloro | " | H | Orange (485) |
| 70 | 2-Hydroxy-5-(β-sulfatoethylsulfonyl)-phenyl | H | Chloro | " | H | Orange (482) |
| 71 | 6-(β-Sulfatoethylsulfonyl)-naphth-2-yl | H | Chloro | " | H | Orange |
| 72 | 6-(β-Sulfatoethylsulfonyl)-8-sulfonaphth-2-yl | H | Chloro | " | H | Orange (485) |
| 73 | 8-(β-Sulfatoethylsulfonyl)-naphth-2-yl | H | Chloro | " | H | Orange |
| 74 | 8-(β-Sulfatoethylsulfonyl)-1-sulfonaphth-2-yl | H | Chloro | " | H | Orange |
| 75 | 8-(β-Sulfatoethylsulfonyl)-6-sulfonaphth-2-yl | H | Chloro | " | H | Orange |
| 76 | 6-(β-Sulfatoethylsulfonyl)-1-sulfonaphth-2-yl | H | Chloro | " | H | Orange (487) |
| 77 | 3-(β-Sulfatoethylsulfonyl)-phenyl | H | Chloro | 2-SO₃H-phenyl (para-methyl) | H | Red (497) |
| 78 | 2-Methoxy-5-(β-sulfatoethylsulfonyl)-phenyl | H | Chloro | " | H | Red |
| 79 | 2-Methoxy-4-(β-sulfatoethylsulfonyl)-phenyl | H | Chloro | " | H | Red |
| 80 | 2-Methyl-5-(β-sulfatoethylsulfonyl)-phenyl | H | Chloro | " | H | Red |
| 81 | 2-Methyl-4-(β-sulfatoethylsulfonyl)-phenyl | H | Chloro | " | H | Red |
| 82 | 4-Methoxy-5-(β-sulfatoethylsulfonyl)-phenyl | H | Chloro | " | H | Red |
| 83 | 4-Methyl-5-(β-sulfatoethylsulfonyl)-phenyl | H | Chloro | " | H | Red |
| 84 | 2-Methoxy-5-methyl-4-(β-sulfatoethylsulfonyl)-phenyl | H | Chloro | " | H | Red |
| 85 | 2,5-Dimethoxy-4-(β-sulfatoethylsulfonyl)-phenyl | H | Chloro | " | H | Red |
| 86 | 2,4-Dimethoxy-5-(β-sulfatoethylsulfonyl)-phenyl | H | Chloro | " | H | Red |
| 87 | 2-Methyl-5-methoxy-4-(β-sulfatoethylsulfonyl)-phenyl | H | Chloro | " | H | Red |
| 88 | 2-Chloro-5-(βsulfatoethylsulfonyl)-phenyl | H | Chloro | " | H | Red |
| 89 | 4-Chloro-2-methyl-3-(β-sulfatoethylsulfonyl)-phenyl | H | Chloro | " | H | Red |
| 90 | 5-Chloro-2-methoxy-3-(β-sulfatoethylsulfonyl)-phenyl | H | Chloro | " | H | Red |
| 91 | 4-(β-Sulfatoethylsulfonyl)-phenyl | H | Chloro | " | H red (546) | Bluish Red |
| 92 | 6-(β-Sulfatoethylsulfonyl)-naphth-2-yl | H | Chloro | " | H | Red |
| 93 | 6-(β-Sulfatoethylsulfonyl)-8-sulfonaphth-2-yl | H | Chloro | " | H | Red (494) |

5,047,515

-continued

| | Monoazo compound of the formula (A) | | | | | |
|---|---|---|---|---|---|---|
| Ex. | Radical R$^a$— | Radical R$^8$— | Radical Y | Radical —D*— | Radical R— | Hue |
| 94 | 8-(β-Sulfatoethylsulfonyl)-naphth-2-yl | H | Chloro | " | H | Red |
| 95 | 8-(β-Sulfatoethylsulfonyl)-1-sulfonaphth-2-yl | H | Chloro | " | H | Red |
| 96 | 8-(β-Sulfatoethylsulfonyl)-6-sulfonaphth-2-yl | H | Chloro | " | H | Orange (487) |
| 97 | 6-(β-Sulfatoethylsulfonyl)-1-sulfonaphth-2-yl | H | Chloro | " | H | Red (498) |
| 98 | 3-(β-Sulfatoethylsulfonyl)-phenyl | H | Chloro | ![benzene with HO₃S] | Methyl | Orange |
| 99 | 2-Methoxy-5-(β-sulfatoethylsulfonyl)-phenyl | H | Chloro | " | Methyl | Orange |
| 100 | 2-Methoxy-4-(β-sulfatoethylsulfonyl)-phenyl | H | Chloro | " | Methyl | Orange |
| 101 | 2-Methyl-5-(β-sulfatoethylsulfonyl)-phenyl | H | Chloro | " | Methyl | Orange |
| 102 | 2-Methyl-4-(β-sulfatoethylsulfonyl)-phenyl | H | Chloro | " | Methyl | Orange |
| 103 | 4-Methoxy-5-(β-sulfatoethylsulfonyl)-phenyl | H | Chloro | " | Methyl | Orange |
| 104 | 4-Methyl-5-(β-sulfatoethylsulfonyl)-phenyl | H | Chloro | " | Methyl | Orange |
| 105 | 2-Methoxy-5-methyl-4-(β-sulfatoethylsulfonyl)-phenyl | H | Chloro | " | Methyl | Orange |
| 106 | 2,5-Dimethoxy-4-(β-sulfatoethylsulfonyl)-phenyl | H | Chloro | " | Methyl | Orange |
| 107 | 2,4-Dimethoxy-5-(β-sulfatoethylsulfonyl)-phenyl | H | Chloro | " | Methyl | Orange |
| 108 | 2-Methyl-5-methoxy-4-(β-sulfatoethylsulfonyl)-phenyl | H | Chloro | " | Methyl | Orange |
| 109 | 2-Chloro-5-(β-sulfatoethylsulfonyl)-phenyl | H | Chloro | " | Methyl | Orange |
| 110 | 4-Chloro-2-methoxy-3-(β-sulfatoethylsulfonyl)-phenyl | H | Chloro | " | Methyl | Orange |
| 111 | 5-Chloro-2-methoxy-4-(β-sulfatoethylsulfonyl)-phenyl | H | Chloro | " | Methyl | Orange |
| 112 | 6-(β-Sulfatoethylsulfonyl)-naphth-2-yl | H | Chloro | " | Methyl | Orange |
| 113 | 6-(β-Sulfatoethylsulfonyl)-8-sulfonaphth-2-yl | H | Chloro | " | Methyl | Orange |
| 114 | 8-(β-Sulfatoethylsulfonyl)-naphth-2-yl | H | Chloro | " | Methyl | Orange |
| 115 | 8-(β-Sulfatoethylsulfonyl)-1-sulfonaphth-2-yl | H | Chloro | " | Methyl | Orange |
| 116 | 8-(β-Sulfatoethylsulfonyl)-6-sulfonaphth-2-yl | H | Chloro | " | Methyl | Orange |
| 117 | 3-(β-Sulfatoethylsulfonyl)-phenyl | H | Chloro | ![benzene with SO₃H] | Methyl | Orange |
| 118 | 2-Methoxy-5-(β-sulfatoethylsulfonyl)-phenyl | H | Chloro | " | Methyl | Orange |
| 119 | 2-Methoxy-4-(β-sulfatoethylsulfonyl)-phenyl | H | Chloro | " | Methyl | Orange |
| 120 | 2-Methyl-5-(β-sulfatoethylsulfonyl)-phenyl | H | Chloro | " | Methyl | Orange |
| 121 | 2-Methyl-4-(β-sulfatoethylsulfonyl)-phenyl | H | Chloro | " | Methyl | Orange |
| 122 | 4-Methoxy-5-(β-sulfatoethylsulfonyl)-phenyl | H | Chloro | " | Methyl | Orange |
| 123 | 4-Methyl-5-(β-sulfatoethylsulfonyl)-phenyl | H | Chloro | " | Methyl | Orange |
| 124 | 2-Methoxy-5-methyl-4-(β-sulfatoethylsulfonyl)-phenyl | H | Chloro | " | Methyl | Orange |
| 125 | 2,5-Dimethoxy-4-(β-sulfatoethylsulfonyl)-phenyl | H | Chloro | " | Methyl | Orange |
| 126 | 2,4-Dimethoxy-5-(β-sulfatoethylsulfonyl)-phenyl | H | Chloro | " | Methyl | Orange |
| 127 | 2-Methyl-5-methoxy-4-(β-sulfatoethylsulfonyl)-phenyl | H | Chloro | " | Methyl | Orange |
| 128 | 2-Chloro-5-(β-sulfatoethylsulfonyl)-phenyl | H | Chloro | " | Methyl | Orange |
| 129 | 4-Chloro-2-methoxy-3-(β-sulfatoethylsulfonyl)-phenyl | H | Chloro | " | Methyl | Orange |
| 130 | 5-Chloro-2-methoxy-4-(β-sulfatoethylsulfonyl)-phenyl | H | Chloro | " | Methyl | Orange |
| 131 | 6-(β-Sulfatoethylsulfonyl)-naphth-2-yl | H | Chloro | " | Methyl | Orange |

| Ex. | Radical R$^a$— | Monoazo compound of the formula (A) Radical R$^8$— | Radical Y | Radical —D*— | Radical R— | Hue |
|---|---|---|---|---|---|---|
| 132 | 6-(β-Sulfatoethylsulfonyl)-8-sulfonaphth-2-yl | H | Chloro | ″ | Methyl | Orange |
| 133 | 8-(β-Sulfatoethylsulfonyl)-naphth-2-yl | H | Chloro | ″ | Methyl | Orange |
| 134 | 8-(β-Sulfatoethylsulfonyl)-1-sulfonaphth-2-yl | H | Chloro | ″ | Methyl | Orange |
| 135 | 8-(β-Sulfatoethylsulfonyl)-6-sulfonaphth-2-yl | H | Chloro | ″ | Methyl | Orange |
| 136 | 3-(β-Sulfatoethylsulfonyl)-phenyl | H | Chloro | ![4-COOH-phenyl] | H | Orange |
| 137 | 2-Methoxy-5-(β-sulfatoethylsulfonyl)-phenyl | H | Chloro | ″ | H | Orange |
| 138 | 2-Methoxy-4-(β-sulfatoethylsulfonyl)-phenyl | H | Chloro | ″ | H | Orange |
| 139 | 2-Methyl-5-(β-sulfatoethylsulfonyl)-phenyl | H | Chloro | ″ | H | Orange |
| 140 | 2-Methyl-4-(β-sulfatoethylsulfonyl)-phenyl | H | Chloro | ″ | H | Orange |
| 141 | 4-Methoxy-5-(β-sulfatoethylsulfonyl)-phenyl | H | Chloro | ″ | H | Orange |
| 142 | 4-Methyl-5-(β-sulfatoethylsulfonyl)-phenyl | H | Chloro | ″ | H | Orange |
| 143 | 2-Methoxy-5-methyl-4-(β-sulfatoethylsulfonyl)-phenyl | H | Chloro | ″ | Methyl | Orange |
| 144 | 2,5-Dimethoxy-4-(β-sulfatoethylsulfonyl)-phenyl | H | Chloro | ″ | H | Orange |
| 145 | 2,4-Dimethoxy-5-(β-sulfatoethylsulfonyl)-phenyl | H | Chloro | ″ | H | Orange |
| 146 | 2-Methyl-5-methoxy-4-(β-sulfatoethylsulfonyl)-phenyl | H | Chloro | ″ | H | Orange |
| 147 | 2-Chloro-5-(β-sulfatoethylsulfonyl)-phenyl | H | Chloro | ″ | H | Orange |
| 148 | 4-Chloro-2-methyl-3-(β-sulfatoethylsulfonyl)-phenyl | H | Chloro | ″ | H | Orange |
| 149 | 5-Chloro-2-methoxy-4-(β-sulfatoethylsulfonyl)-phenyl | H | Chloro | ″ | H | Orange |
| 150 | 4-(β-Sulfatoethylsulfonyl)-phenyl | H | Chloro | ″ | H | Orange |
| 151 | 6-(β-Sulfatoethylsulfonyl)-naphth-2-yl | H | Chloro | ″ | H | Orange |
| 152 | 6-(β-Sulfatoethylsulfonyl)-8-sulfonaphth-2-yl | H | Chloro | ″ | H | Orange |
| 153 | 8-(β-Sulfatoethylsulfonyl)-naphth-2-yl | H | Chloro | ″ | H | Orange |
| 154 | 8-(β-Sulfatoethylsulfonyl)-1-sulfonaphth-2-yl | H | Chloro | ″ | H | Orange |
| 155 | 8-(β-Sulfatoethylsulfonyl)-6-sulfonaphth-2-yl | H | Chloro | ″ | H | Orange |
| 156 | 3-(β-Sulfatoethylsulfonyl)-phenyl | H | Chloro | ![4-COOH-phenyl] | H | Orange |
| 157 | 2-Methoxy-5-(β-sulfatoethylsulfonyl)-phenyl | H | Chloro | ″ | H | Orange |
| 158 | 2-Methoxy-4-(β-sulfatoethylsulfonyl)-phenyl | H | Chloro | ″ | H | Orange |
| 159 | 2-Methyl-5-(β-sulfatoethylsulfonyl)-phenyl | H | Chloro | ″ | H | Orange |
| 160 | 2-Methyl-4-(β-sulfatoethylsulfonyl)-phenyl | H | Chloro | ″ | H | Orange |
| 161 | 4-Methoxy-5-(β-sulfatoethylsulfonyl)-phenyl | H | Chloro | ″ | H | Orange |
| 162 | 4-Methyl-5-(β-sulfatoethylsulfonyl)-phenyl | H | Chloro | ″ | H | Orange |
| 163 | 2-Methoxy-5-methyl-4-(β-sulfatoethylsulfonyl)-phenyl | H | Chloro | ″ | H | Orange |
| 164 | 2,5-Dimethoxy-4-(β-sulfatoethylsulfonyl)-phenyl | H | Chloro | ″ | H | Orange |
| 165 | 2,4-Dimethoxy-5-(β-sulfatoethylsulfonyl)-phenyl | H | Chloro | ″ | H | Orange |
| 166 | 2-Methyl-5-methoxy-4-(β-sulfatoethylsulfonyl)-phenyl | H | Chloro | ″ | H | Orange |
| 167 | 2-Chloro-5-(β-sulfatoethylsulfonyl)-phenyl | H | Chloro | ″ | H | Orange |
| 168 | 4-Chloro-2-methyl-3-(β-sulfatoethylsulfonyl)-phenyl | H | Chloro | ″ | H | Orange |
| 169 | 5-Chloro-2-methoxy-4-(β-sulfatoethylsulfonyl)-phenyl | H | Chloro | ″ | H | Orange |
| 170 | 4-(β-Sulfatoethylsulfonyl)-phenyl | H | Chloro | ″ | H | Orange |

-continued

Monoazo compound of the formula (A)

| Ex. | Radical R$^a$— | Radical R$^8$— | Radical Y | Radical —D*— | Radical R— | Hue |
|---|---|---|---|---|---|---|
| 171 | 6-(β-Sulfatoethylsulfonyl)-naphth-2-yl | H | Chloro | " | H | Orange |
| 172 | 6-(β-Sulfatoethylsulfonyl)-8-sulfonaphth-2-yl | H | Chloro | " | H | Orange |
| 173 | 8-(β-Sulfatoethylsulfonyl)-naphth-2-yl | H | Chloro | " | H | Orange |
| 174 | 8-(β-Sulfatoethylsulfonyl)-1-sulfonaphth-2-yl | H | Chloro | " | H | Orange |
| 175 | 8-(β-Sulfatoethylsulfonyl)-6-sulfonaphth-2-yl | H | Chloro | " | H | Orange |
| 176 | 2-Methoxy-5-(β-sulfatoethylsulfonyl)-phenyl | H | Fluoro | " | H | Orange |
| 177 | 2-Methoxy-4-(β-sulfatoethylsulfonyl)-phenyl | H | Fluoro | 4,6-Disulfo-1,3-phenylene | H | Orange |
| 178 | 2-Methyl-5-(β-sulfatoethylsulfonyl)-phenyl | H | Fluoro | " | H | Orange |
| 179 | 2-Methyl-4-(β-sulfatoethylsulfonyl)-phenyl | H | Fluoro | " | H | Orange |
| 180 | 4-Methoxy-5-(β-sulfatoethylsulfonyl)-phenyl | H | Fluoro | " | H | Orange |
| 181 | 4-Methyl-5-(β-sulfatoethylsulfonyl)-phenyl | H | Fluoro | " | H | Orange |
| 182 | 2-Methoxy-5-methyl-4-(β-sulfatoethylsulfonyl)-phenyl | H | Fluoro | " | H | Orange |
| 183 | 2,5-Dimethoxy-4-(β-sulfatoethylsulfonyl)-phenyl | H | Fluoro | " | H | Orange |
| 184 | 2,4-Dimethoxy-5-(β-sulfatoethylsulfonyl)-phenyl | H | Fluoro | " | H | Orange |
| 185 | 2-Methyl-5-methoxy-4-(β-sulfatoethylsulfonyl)-phenyl | H | Fluoro | " | H | Orange |
| 186 | 2-Chloro-5-(β-sulfatoethylsulfonyl)-phenyl | H | Fluoro | " | H | Orange |
| 187 | 4-Chloro-2-methyl-3-(β-sulfatoethylsulfonyl)-phenyl | H | Fluoro | " | H | Orange |
| 188 | 5-Chloro-2-methoxy-4-(β-sulfatoethylsulfonyl)-phenyl | H | Fluoro | " | H | Orange |
| 189 | 4-(β-Sulfatoethylsulfonyl)-phenyl | H | Fluoro | " | H | Orange |
| 190 | 6-(β-Sulfatoethylsulfonyl)-naphth-2-yl | H | Fluoro | " | H | Orange |
| 191 | 6-(β-Sulfatoethylsulfonyl)-8-sulfonaphth-2-yl | H | Fluoro | " | H | Orange (483) |
| 192 | 8-(β-Sulfatoethylsulfonyl)-naphth-2-yl | H | Fluoro | " | H | Orange |
| 193 | 8-(β-Sulfatoethylsulfonyl)-1-sulfonaphth-2-yl | H | Fluoro | " | H | Orange |
| 194 | 8-(β-Sulfatoethylsulfonyl)-6-sulfonaphth-2-yl | H | Fluoro | " | H | Red (501) |
| 195 | 3-(β-Sulfatoethylsulfonyl)-phenyl | H | Fluoro | 2,5-disulfo-phenyl (SO₃H substituted benzene) | H | Red |
| 196 | 2-Methoxy-5-(β-sulfatoethylsulfonyl)-phenyl | H | Fluoro | " | H | Red |
| 197 | 2-Methoxy-4-(β-sulfatoethylsulfonyl)-phenyl | H | Fluoro | " | H | Red |
| 198 | 2-Methyl-5-(β-sulfatoethylsulfonyl)-phenyl | H | Fluoro | " | H | Red |
| 199 | 2-Methyl-4-(β-sulfatoethylsulfonyl)-phenyl | H | Fluoro | " | H | Red |
| 200 | 4-Methoxy-5-(β-sulfatoethylsulfonyl)-phenyl | H | Fluoro | " | H | Red |
| 201 | 4-Methyl-5-(β-sulfatoethylsulfonyl)-phenyl | H | Fluoro | " | H | Red |
| 202 | 2-Methoxy-5-methyl-4-(β-sulfatoethylsulfonyl)-phenyl | H | Fluoro | " | H | Red |
| 203 | 2,5-Dimethoxy-4-(β-sulfatoethylsulfonyl)-phenyl | H | Fluoro | " | H | Red |
| 204 | 2,4-Dimethoxy-5-(β-sulfatoethylsulfonyl)-phenyl | H | Fluoro | " | H | Red |
| 205 | 2-Methyl-5-methoxy-4-(β-sulfatoethylsulfonyl)-phenyl | H | Fluoro | " | H | Red |
| 206 | 2-Chloro-5-(β-sulfatoethylsulfonyl)-phenyl | H | Fluoro | " | H | Red |
| 207 | 4-Chloro-2-methyl-3-(β-sulfatoethylsulfonyl)-phenyl | H | Fluoro | " | H | Red |
| 208 | 5-Chloro-2-methoxy-4-(β-sulfatoethylsulfonyl)-phenyl | H | Fluoro | " | H | Red |
| 209 | 4-(β-Sulfatoethylsulfonyl)-phenyl | H | Fluoro | " | H | Red |
| 210 | 6-(β-Sulfatoethylsulfonyl)-naphth-2-yl | H | Fluoro | " | H | Red |
| 211 | 6-(β-Sulfatoethylsulfonyl)-8-sulfonaphth-2-yl | H | Fluoro | " | H | Red |
| 212 | 8-(β-Sulfatoethylsulfonyl)-naphth-2-yl | H | Fluoro | " | H | Red |
| 213 | 8-(β-Sulfatoethylsulfonyl)-1-sulfonaphth-2-yl | H | Fluoro | " | H | Red |
| 214 | 8-(β-Sulfatoethylsulfonyl)-6-sulfonaphth-2-yl | H | Fluoro | " | H | Red |

-continued

| Ex. | Radical R$^a$— | Radical R$^8$— | Radical Y | Radical —D*— | Radical R— | Hue |
|---|---|---|---|---|---|---|
| 215 | 3-(β-Sulfatoethylsulfonyl)-phenyl | H | Fluoro | 2-methyl-5-HO₃S-phenyl | Methyl | Orange |
| 216 | 2-Methoxy-5-(β-sulfatoethylsulfonyl)-phenyl | H | Fluoro | " | Methyl | Orange |
| 217 | 2-Methoxy-4-(β-sulfatoethylsulfonyl)-phenyl | H | Fluoro | " | Methyl | Orange |
| 218 | 2-Methyl-5-(β-sulfatoethylsulfonyl)-phenyl | H | Fluoro | " | Methyl | Orange |
| 219 | 2-Methyl-4-(β-sulfatoethylsulfonyl)-phenyl | H | Fluoro | " | Methyl | Orange |
| 220 | 4-Methoxy-5-(β-sulfatoethylsulfonyl)-phenyl | H | Fluoro | " | Methyl | Orange |
| 221 | 4-Methyl-5-(β-sulfatoethylsulfonyl)-phenyl | H | Fluoro | " | Methyl | Orange |
| 222 | 2-Methoxy-5-methyl-4-(β-sulfatoethylsulfonyl)-phenyl | H | Fluoro | " | Methyl | Orange |
| 223 | 2,5-Dimethoxy-4-(β-sulfatoethylsulfonyl)-phenyl | H | Fluoro | " | Methyl | Orange |
| 224 | 2,4-Dimethoxy-5-(β-sulfatoethylsulfonyl)-phenyl | H | Fluoro | " | Methyl | Orange |
| 225 | 2-Methyl-5-methoxy-4-(β-sulfatoethylsulfonyl)-phenyl | H | Fluoro | " | Methyl | Orange |
| 226 | 2-Chloro-5-(β-sulfatoethylsulfonyl)-phenyl | H | Fluoro | " | Methyl | Orange |
| 227 | 4-Chloro-2-methyl-3-(β-sulfatoethylsulfonyl)-phenyl | H | Fluoro | " | Methyl | Orange |
| 228 | 5-Chloro-2-methoxy-4-(β-sulfatoethylsulfonyl)-phenyl | H | Fluoro | " | Methyl | Orange |
| 229 | 6-(β-sulfatoethylsulfonyl)-naphth-2-yl | H | Fluoro | " | Methyl | Orange |
| 230 | 6-(β-Sulfatoethylsulfonyl)-8-sulfonaphth-2-yl | H | Fluoro | " | Methyl | Orange |
| 231 | 8-(β-Sulfatoethylsulfonyl)-naphth-2-yl | H | Fluoro | " | Methyl | Orange |
| 232 | 8-(β-Sulfatoethylsulfonyl)-1-sulfonaphth-2-yl | H | Fluoro | " | Methyl | Orange |
| 233 | 8-(β-Sulfatoethylsulfonyl)-6-sulfonaphth-2-yl | H | Fluoro | " | Methyl | Orange |
| 234 | 3-(β-Sulfatoethylsulfonyl)-phenyl | H | Fluoro | 2-methyl-4-SO₃H-phenyl | Methyl | Orange |
| 235 | 2-Methoxy-5-(β-sulfatoethylsulfonyl)-phenyl | H | Fluoro | " | Methyl | Orange |
| 236 | 2-Methoxy-4-(β-sulfatoethylsulfonyl)-phenyl | H | Fluoro | " | Methyl | Orange |
| 237 | 2-Methyl-5-(β-sulfatoethylsulfonyl)-phenyl | H | Fluoro | " | Methyl | Orange |
| 238 | 2-Methyl-4-(β-sulfatoethylsulfonyl)-phenyl | H | Fluoro | " | Methyl | Orange |
| 239 | 4-Methoxy-5-(β-sulfatoethylsulfonyl)-phenyl | H | Fluoro | " | Methyl | Orange |
| 240 | 4-Methyl-5-(β-sulfatoethylsulfonyl)-phenyl | H | Fluoro | " | Methyl | Orange |
| 241 | 2-Methoxy-5-methyl-4-(β-sulfatoethylsulfonyl)-phenyl | H | Fluoro | " | Methyl | Orange |
| 242 | 2,5-Dimethoxy-4-(β-sulfatoethylsulfonyl)-phenyl | H | Fluoro | " | Methyl | Orange |
| 243 | 2,4-Dimethoxy-5-(β-sulfatoethylsulfonyl)-phenyl | H | Fluoro | " | Methyl | Orange |
| 244 | 2-Methyl-5-methoxy-4-(β-sulfatoethylsulfonyl)-phenyl | H | Fluoro | " | Methyl | Orange |
| 245 | 2-Chloro-5-(β-sulfatoethylsulfonyl)-phenyl | H | Fluoro | " | Methyl | Orange |
| 246 | 4-Chloro-2-methyl-3-(β-sulfatoethylsulfonyl)-phenyl | H | Fluoro | " | Methyl | Orange |
| 247 | 5-Chloro-2-methoxy-4-(β-sulfatoethylsulfonyl)-phenyl | H | Fluoro | " | Methyl | Orange |
| 248 | 6-(β-Sulfatoethylsulfonyl)-naphth-2-yl | H | Fluoro | " | Methyl | Orange |
| 249 | 6-(β-Sulfatoethylsulfonyl)-8-sulfonaphth-2-yl | H | Fluoro | " | Methyl | Orange |
| 250 | 8-(β-Sulfatoethylsulfonyl)-naphth-2-yl | H | Fluoro | " | Methyl | Orange |
| 251 | 8-(β-Sulfatoethylsulfonyl)-1-sulfonaphth-2-yl | H | Fluoro | " | Methyl | Orange |
| 252 | 8-(β-Sulfatoethylsulfonyl)-6-sulfonaphth-2-yl | H | Fluoro | " | Methyl | Orange |
| 253 | 3-(β-Sulfatoethylsulfonyl)-phenyl | H | Fluoro | 4,6-Disulfo-1,3-phenylene | H | Orange |

-continued

| | | Monoazo compound of the formula (A) | | | | |
|---|---|---|---|---|---|---|
| Ex. | Radical R<sup>α</sup>— | Radical R<sup>8</sup>— | Radical Y | Radical —D*— | Radical R— | Hue |
| 254 | 3-(β-Sulfatoethylsulfonyl)-phenyl | H | Fluoro | 4-sulfophenyl | H | Orange |
| 255 | 2-Methoxy-5-(β-sulfatoethylsulfonyl)-phenyl | H | Fluoro | " | H | Orange |
| 256 | 2-Methoxy-4-(β-sulfatoethylsulfonyl)-phenyl | H | Fluoro | " | H | Orange |
| 257 | 2-Methyl-5-(β-sulfatoethylsulfonyl)-phenyl | H | Fluoro | " | H | Orange |
| 258 | 2-Methyl-4-(β-sulfatoethylsulfonyl)-phenyl | H | Fluoro | " | H | Orange |
| 259 | 4-Methoxy-5-(β-sulfatoethylsulfonyl)-phenyl | H | Fluoro | " | H | Orange |
| 260 | 4-Methyl-5-(β-sulfatoethylsulfonyl)-phenyl | H | Fluoro | " | H | Orange |
| 261 | 2-Methoxy-5-methyl-4-(β-sulfatoethylsulfonyl)-phenyl | H | Fluoro | " | H | Orange |
| 262 | 2,5-Dimethoxy-4-(β-sulfatoethylsulfonyl)-phenyl | H | Fluoro | " | H | Orange |
| 263 | 2,4-Dimethoxy-5-(β-sulfatoethylsulfonyl)-phenyl | H | Fluoro | " | H | Orange |
| 264 | 2-Methyl-5-methoxy-4-(β-sulfatoethylsulfonyl)-phenyl | H | Fluoro | " | H | Orange |
| 265 | 2-Chloro-5-(β-sulfatoethylsulfonyl)-phenyl | H | Fluoro | " | H | Orange |
| 266 | 4-Chloro-2-methyl-3-(β-sulfatoethylsulfonyl)-phenyl | H | Fluoro | " | H | Orange |
| 267 | 5-Chloro-2-methoxy-4-(β-sulfatoethylsulfonyl)-phenyl | H | Fluoro | " | H | Orange |
| 268 | 6-(β-Sulfatoethylsulfonyl)-naphth-2-yl | H | Fluoro | " | H | Orange |
| 269 | 6-(β-Sulfatoethylsulfonyl)-8-sulfonaphth-2-yl | H | Fluoro | " | H | Orange |
| 270 | 8-(β-Sulfatoethylsulfonyl)-naphth-2-yl | H | Fluoro | " | H | Orange |
| 271 | 8-(β-Sulfatoethylsulfonyl)-1-sulfonaphth-2-yl | H | Fluoro | " | H | Orange |
| 272 | 8-(β-Sulfatoethylsulfonyl)-6-sulfonaphth-2-yl | H | Fluoro | " | H | Orange |
| 273 | 3-(β-Sulfatoethylsulfonyl)-phenyl | H | Fluoro | 2,5-Disulfo-1,4-phenylene | H | Orange |
| 274 | 2-Methoxy-5-(β-sulfatoethylsulfonyl)-phenyl | H | Fluoro | " | H | Orange (482) |
| 275 | 2,5-Dimethoxy-4-(β-sulfatoethylsulfonyl)-phenyl | H | Fluoro | " | H | Orange |
| 276 | 2-Methyl-5-(β-sulfatoethylsulfonyl)-phenyl | H | Fluoro | " | H | Orange |
| 277 | 2-Methyl-4-(β-sulfatoethylsulfonyl)-phenyl | H | Fluoro | " | H | Orange |
| 278 | 2-Methyl-4-methoxy-5-(β-sulfatoethylsulfonyl)-phenyl | H | Fluoro | " | H | Orange |
| 279 | 4-Methyl-5-(β-sulfatoethylsulfonyl)-phenyl | H | Fluoro | " | H | Orange |
| 280 | 2-Methoxy-5-methyl-4-(β-sulfatoethylsulfonyl)-phenyl | H | Fluoro | " | H | Orange |
| 281 | 2,5-Dimethoxy-4-(β-sulfatoethylsulfonyl)-phenyl | H | Fluoro | " | H | Orange |
| 282 | 2,4-Dimethoxy-5-(β-sulfatoethylsulfonyl)-phenyl | H | Fluoro | " | H | Orange |
| 283 | 2-Methyl-5-methoxy-4-(β-sulfatoethylsulfonyl)-phenyl | H | Fluoro | " | H | Orange |
| 284 | 2-Chloro-5-(β-sulfatoethylsulfonyl)-phenyl | H | Fluoro | " | H | Orange |
| 285 | 4-Chloro-2-methyl-3-(β-sulfatoethylsulfonyl)-phenyl | H | Fluoro | " | H | Orange |
| 286 | 5-Chloro-2-methoxy-4-(β-sulfatoethylsulfonyl)-phenyl | H | Fluoro | " | H | Orange |
| 287 | 4-(β-Sulfatoethylsulfonyl)-phenyl | H | Fluoro | " | H | Orange |
| 288 | 6-(β-Sulfatoethylsulfonyl)-naphth-2-yl | H | Fluoro | " | H | Orange |
| 289 | 6-(β-Sulfatoethylsulfonyl)-8-sulfonaphth-2-yl | H | Fluoro | " | H | Orange |
| 290 | 8-(β-Sulfatoethylsulfonyl)-naphth-2-yl | H | Fluoro | " | H | Orange |
| 291 | 8-(β-Sulfatoethylsulfonyl)-1-sulfonaphth-2-yl | H | Fluoro | " | H | Orange |
| 292 | 8-(β-Sulfatoethylsulfonyl)-6-sulfonaphth-2-yl | H | Fluoro | " | H | Orange |

We claim:
1. A monoazo compound of the formula

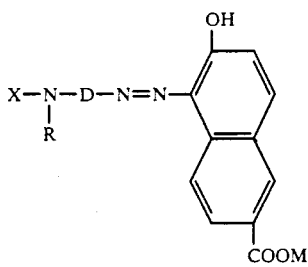

where
D is para- or meta-phenylene, each substituted by sulfo,
R is hydrogen,
M is hydrogen or alkali metal,
X is a group of the formula

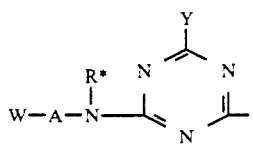

where
Y is chlorine,
R* is hydrogen,
A is a direct bond and

W is a group of the formula

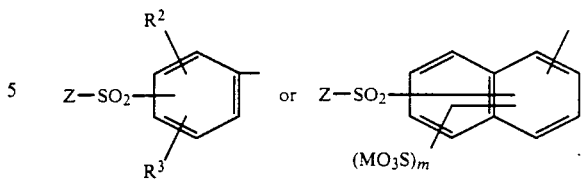

where
$R^2$ is hydrogen,
$R^3$ is hydrogen,
Z denotes vinyl or is ethyl which is substituted in the β- position by a substituent which can be eliminated by alkali to form a vinyl group,
M is the number zero, 1 or 2 (in the case of m being zero, this group denoting hydrogen) and
M has the above mentioned meaning.

2. A compound as claimed in claim 1, wherein D is a group of the formula

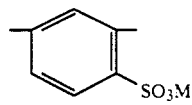

where M is hydrogen or an alkali metal.

3. A compound as claimed in claim 1, wherein Z is vinyl or β-sulfatoethyl.

4. A compound as claimed in claim 1 conforming to the formula

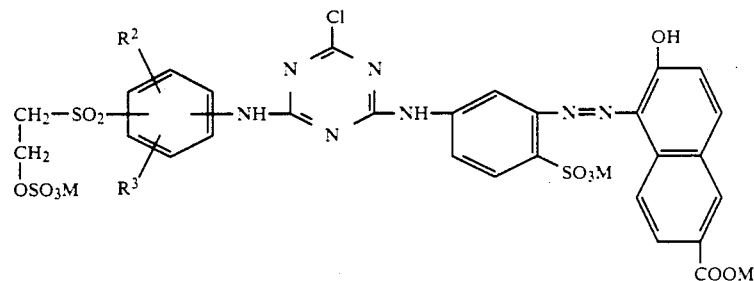

where M, $R^2$ and $R^3$ are as defined in claim 1 and β-sulfatoethylsulfonyl is bonded to the benzene nucleus in the meta- or para-position relative to the amino group.

5. A compound as claimed in claim 1, wherein M is hydrogen or an alkali metal.

6. A compound as claimed in claim 1, wherein Z is β-sulfatoethyl.

7. A compound as claimed in claim 4, wherein Z is β-sulfatoethyl.

* * * * *